March 3, 1936.  A. J. WILLIAMS, JR  2,032,455
VOLTAGE REGULATING SYSTEM
Filed Sept. 13, 1934  2 Sheets-Sheet 1
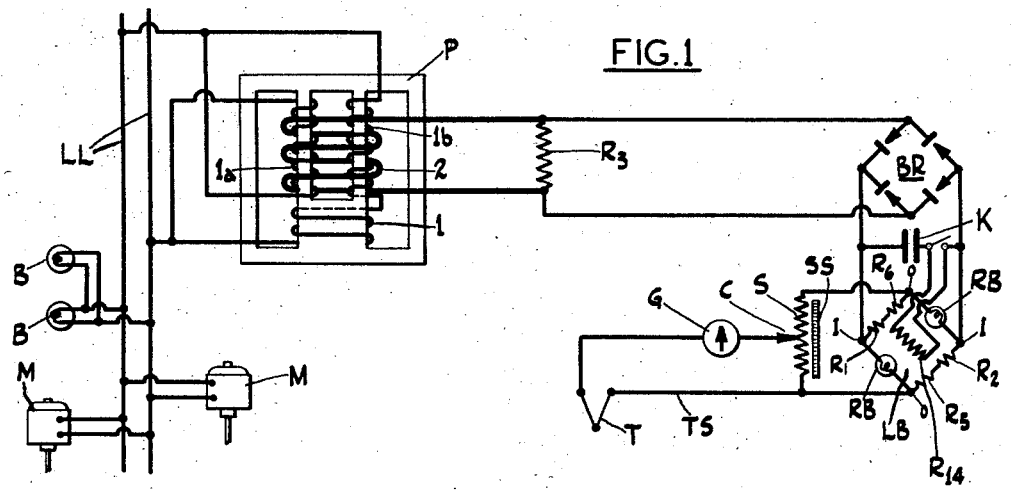
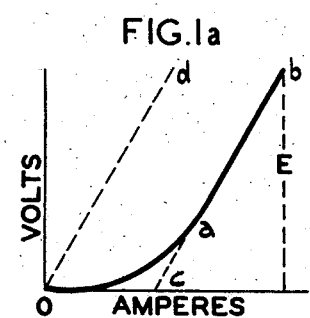
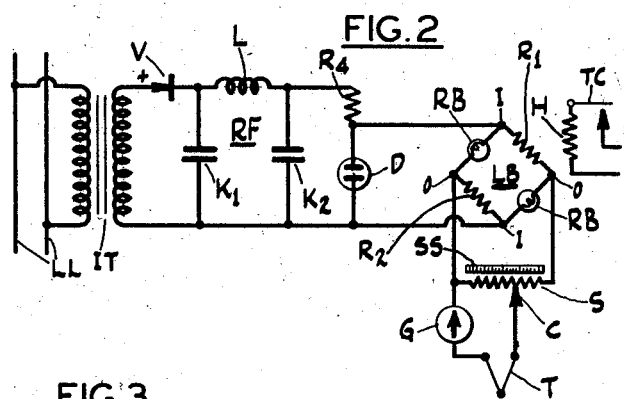
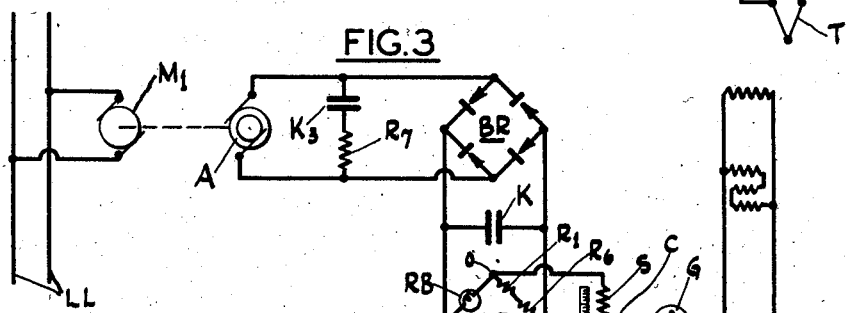
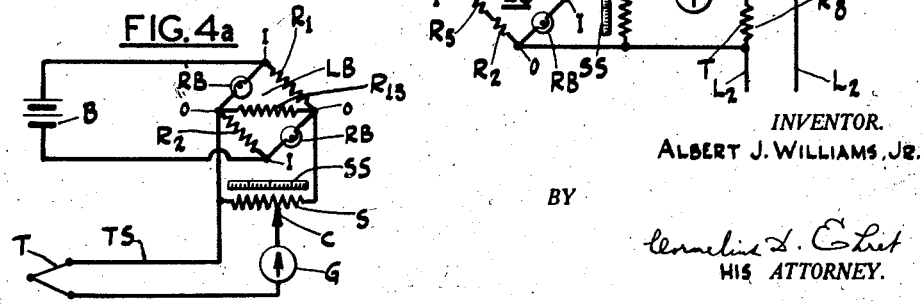
INVENTOR.
ALBERT J. WILLIAMS, JR.
BY
HIS ATTORNEY.

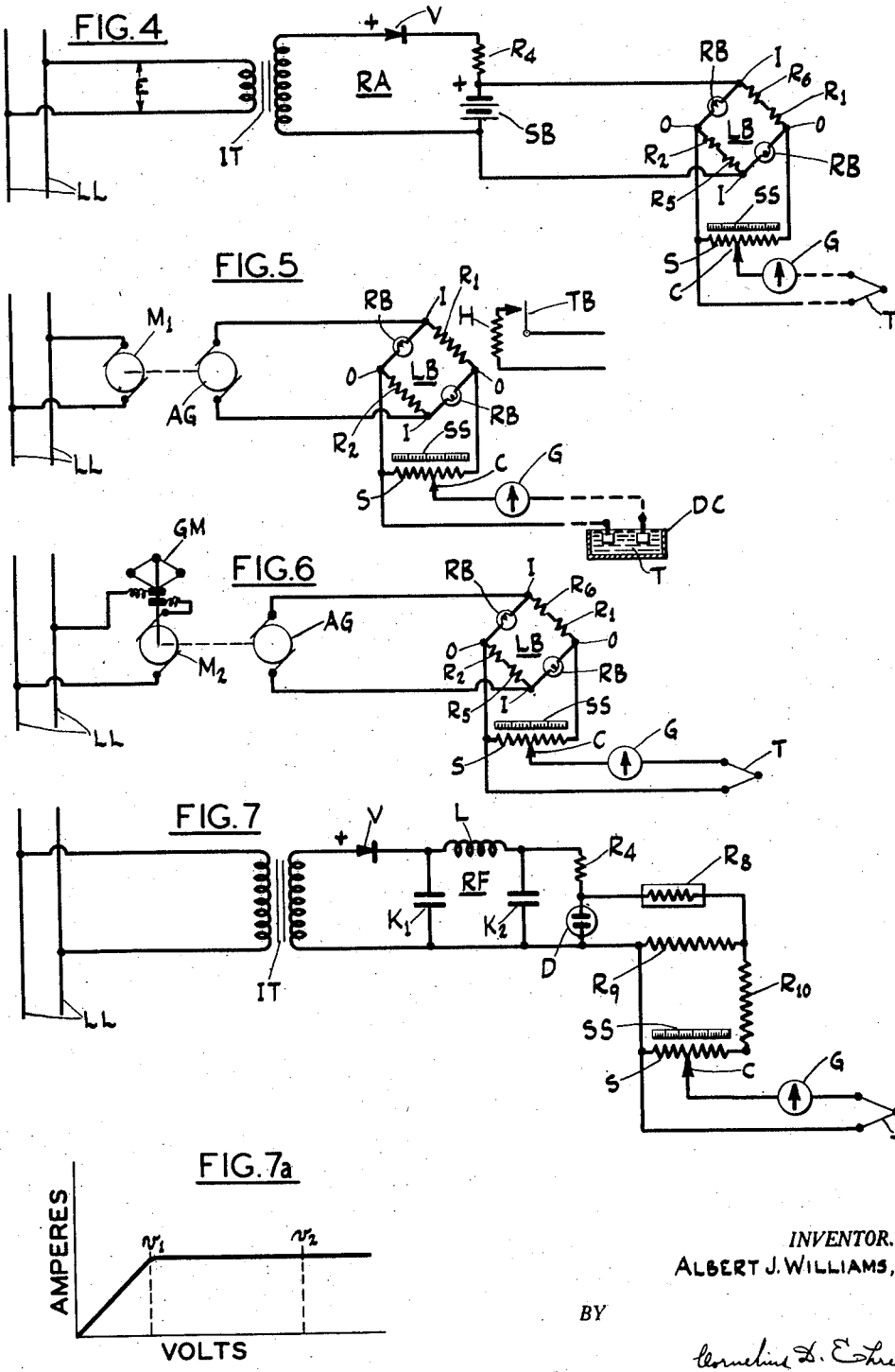

Patented Mar. 3, 1936

2,032,455

UNITED STATES PATENT OFFICE 2,032,455

VOLTAGE REGULATING SYSTEM

Albert J. Williams, Jr., Philadelphia, Pa., assignor to Leeds & Northrup Company, Philadelphia, Pa., a corporation of Pennsylvania Application September 13, 1934, Serial No. 743,872

22 Claims. (Cl. 171—312)

My invention relates to electrical systems for measuring the magnitude or changes in magnitude of a condition as electrical, physical, chemical, etc.; and more particularly to the derivation from an ordinary source of current, of a current of high degree of constancy suitable for use in precision measurements.

In accordance with my invention, there is interposed between the source of current and the measuring circuit or network, a system which substantially eliminates the effect upon current delivered to the measuring system of both rapid and gradual changes of the voltage of the source; more specifically, in some form of the invention the supply source is connected to a device or arrangement which is capable of affording a substantially constant output despite changes of the supply voltage, but which may itself, due to other influences, produce an output current which changes slowly; and the output of such device or arrangement is supplied to another device or arrangement, such as a lamp bridge, which has the characteristic of affording a highly constant current output so long as the changes of its input voltage are not rapid, and which supplies the measuring circuit or network.

My invention further resides in the methods and systems hereinafter described and claimed.

For an understanding of my invention reference is to be had to the accompanying drawings, in which Figs. 1, 2, 3, 4, 4a, 5, 6 and 7 illustrate diagrammatically various forms of the invention, and Figs. 1a and 7a are explanatory curves discussed in the description of the operation thereof.

Referring to Fig. 1, the line LL is an alternating current supply line such as is commonly available for supply of power to translating devices, as motors M, lamps B, and the like. The voltage of such a line is subject to both rapid and slow changes in magnitude rendering it unfit for use as a standard of comparison in precision measurements.

The transformer P is of a known type of construction having the characteristic that the output voltage from the secondary 2 remains fairly constant despite rapid variations in magnitude of the input or line voltage. Briefly, the flux of primary coil $1b$ is in opposition to the flux of the main primary coil $1$ with which coil $1b$ is electrically in series; and the flux of primary coil $1a$ is cumulative with the flux of primary coil $1$ with which coils $1a$ is electrically in parallel. The coils and the legs of the transformer core are so proportioned that for normal line voltage the leg on which coil $1a$ is wound is at or near the knee of its magnetic saturation curve, and the leg on which coil $1b$ is wound is on the straight portion of its magnetic saturation curve. The purpose of the aiding and bucking coils $1a$ and $1b$, and the split construction of the portion of the core on which the secondary $2$ is wound, is to maintain substantial constancy of the magnetic field in which the secondary winding is disposed. For fuller discussion of the construction and theory of operation of transformers of this type reference is made to Patents 1,828,900 and 1,830,232, to Kouyoumjian.

It has been found, however, that the output voltage of this type of transformer is not suited for supplying a potentiometer network, or the like, used in precision measurements as the output voltage varies slowly, in whole or in part due to the inability of the transformer completely to compensate for large but slow changes in line voltage, and in whole or in part due to the effect of time and temperature, for example, upon the iron and windings of the transformer which cause changes in output voltage from time to time.

The measuring network in Fig. 1 comprises the potentiometer resistance S having a relatively adjustable contact C, a responsive device, as thermocouple T, for producing a voltage whose magnitude is a function of the magnitude of the condition under measurement, and a galvanometer G, or equivalent, responsive to unbalance between the voltage produced or determined by T, and the voltage between the contact C and the common conductor TS. The scale SS is suitably calibrated, its position relative to the adjustable element of the slide wire when the network is balanced indicating the magnitude of the condition. The scale is calibrated for a certain magnitude of voltage applied to the terminals of resistance S and the readings are incorrect if that standard magnitude of voltage is not applied. Therefore, if the resistance S is connected across the transformer secondary 2, without interposition of apparatus hereinafter described, the readings may, for substantial periods of time, be too high and too low for other substantial periods of time, the error in neither case remaining fixed.

To compensate for the deficiencies of transformer P and to correct for the errors which it introduces, there is interposed between the secondary terminals of transformer P and the measuring circuit, a device or arrangement LB which affords an extremely constant output voltage notwithstanding variations of its input voltage.

Specifically, device LB is a lamp bridge, having lamps RB, RB with filaments of tungsten, or other metallic conductors, in one pair of opposite arms thereof and resistances R1, R2 in the other pair of opposite arms, the bridge is unbalanced so that the desired voltage difference for application to the potentiometer resistance S exists between the output terminals O, O of the bridge.

As in the particular arrangement shown, the measuring system is of the direct current type the input terminals I, I of the bridge instead of being directly connected to the secondary of transformer P are connected to the rectifier system BR, which, as shown, may be a bridge-type rectifier preferably utilizing rectifier elements of the solid type, as the copper, copper-oxide type. For uses involving a standard alternating current, the rectifier bridge is omitted and galvanometer G is of the alternating current type.

Referring to Fig. 1a, the curve oab is characteristic of the volt-ampere curve of a tungsten filament RB. Over a considerable range the curve is linear and the intercept c of the projection of the linear part of the curve with the current axis is substantially displaced from the origin o; specifically, the current value at c is approximately 50% of the normal rated current of the lamp.

The resistances R1, R2 are of the usual type whose volt-ampere curve od is linear throughout, and are chosen so that curve od is parallel to the linear portion ab of curve oab. It therefore follows that so long as the lamps are operated on the linear portions of their curves, the input voltage may vary substantially without changing the current flowing through the potentiometer resistance from the lamp bridge.

Though the output voltage of transformer P changes substantially from time to time for various reasons, a predetermined standard current always flows through resistance S so that the measurements of the condition affecting the responsive device T are always highly accurate. As illustrative of the constancy obtainable, the output voltage at O, O of the system of Fig. 1, supplied from a 110 volt, 60 cycle power line, did not vary, over a period of about nine months, more than ±.4 per cent.

The lamp bridge of itself is not suited for connection to line L, L without transformer P or its equivalent, since it cannot compensate for rapid fluctuations in voltage. Upon sudden change in input voltage, time is required before the filament assumes its new temperature, and in the meantime an improper value of current would flow through potentiometer resistance S giving spurious readings. For example, if the measuring system included a self-balancing recorder or controller such as shown in Squibb Patent No. 1,935,732, sudden changes in input voltage would cause the chart to indicate changes of the condition under measurement when none occurred, or if concurrent with changes in the measured condition would indicate an improper magnitude.

In the complete system, the special transformer P compensates for the inability of the lamp bridge to give constant output for sudden changes of line voltage, and the lamp bridge LB compensates for the inability of the transformer P to give constant output voltage for large but slow changes of input voltage and also corrects for slow changes of output voltage produced by conditions other than line voltage upon the transformer components.

Preferably, the transformer secondary is shunted by a resistance R3 of such magnitude that the total resistance of the network R3, BR, LB, etc., as viewed from the transformer secondary remains substantially constant though the resistance of the network beyond R3 varies to greater percentage in normal operation of the system; i. e., by making the resistance of R3 of suitably low magnitude, any variation of the resistance of the lamp bridge, etc., effects a smaller percentage change of the total current drawn from the transformer secondary than if R3 were omitted.

Preferably, an electrolytic condenser K, of suitably large magnitude, as 2000 mfd., is connected across the output terminals of the rectifier to eliminate ripples in the output voltage which would complicate the action of the incandescent resistors.

The advantage of the system in that it makes possible the use of ordinary power lines to supply precision measuring or control apparatus avoiding the use of standard cells, and consequent need for frequent inspection and recalibration.

In the system shown in Fig. 2, the line voltage supplies a rectifier-filter system RF comprising a rectifier V which may be of the tube, or any other known type, and a filter including, for example, inductance L and condensers K1, K2. For a singe $\pi$ section filter as shown, suitable values are L=30 henries, K=2 mfd., and K1=8 mfd. The values are not critical and other known filter arrangements are suitable.

The output of the filter is shunted by resistance R4 and a gaseous discharge tube D in series. The lamp bridge LB is connected across the discharge tube D.

Under operating conditions, the voltage difference between the electrodes of the discharge tube is always higher than the critical voltage of the gas therein. When the output voltage of the filter system tends to rise, more current at once flows through the discharge tube increasing the drop of voltage in resistance R4; conversely, when the filter output voltage falls, less current flows at once through the discharge tube reducing the voltage drop in resistance R4. The effect in all cases is toward maintenance of a constant voltage across the input terminals of the lamp bridge.

However, the voltage thus derived from the power lines is not free from drift or gradual change. The rectifier-filter system is incapable of correcting from changes of this type, and in fact of itself has the characteristic of introducing variation of its output voltage. Time and different atmospheric conditions affect the characteristic of the components of the rectifier system. While for most uses of rectifier systems, these changes are of no importance, the situation is otherwise for precision measurements.

Therefore, as in Fig. 1, a lamp bridge LB, or equivalent, is interposed to compensate for gradual changes of line voltage and slow variation of the characteristics of the components of the rectifier-filter system. The combination of the lamp bridge and the rectifier-filter system affords high degree of constancy of the current through the potentiometer resistance S ensuring accurate readings at all times of the magnitude of the condition under measurement.

When the line LL is for supplying direct current, the rectifier V may be omitted, and transformer IT is omitted.

In either the system of Fig. 1 or 2, or similar systems hereinafter described, the effect of ambient temperature upon the lamp bridge may be compensated either by disposition of the bridge elements in an enclosure in which the atmospheric temperature is controlled, or by using in the bridge system resistance elements having a proper coefficient of resistance. In Fig. 2 the heater H is controlled by thermostat TC to maintain the temperature of the atmosphere adjacent the bridge LB substantially constant. In Fig. 1, the temperature compensating resistances R5, R6 are of copper or other metal having a positive resistance-temperature coefficient if the lamp filaments are of tungsten or other metal having a positive resistance temperature coefficient. In general, if the compensating resistances are in the same arms of the bridge as the lamp, they should have a temperature-resistance coefficient opposite in sign to the temperature-resistance coefficient of the lamps while if they are in opposite arms of the bridge their temperature-resistance coefficient should be of the same sign as that of the lamps.

Alternatively or in conjunction with either of these arrangements, the resistance R14 may be included in series with condenser K across the input conductors of the bridge and disposed so as to be subject to substantially the same ambient temperature or changes of ambient temperature as the bridge LB. The conductor comprising resistance R14 should have a positive temperature coefficient when the lamps of the bridge are of tungsten or other material having a positive temperature coefficient.

An increase, for example, of ambient temperature tends to effect an increase of the resistance of the lamps, reducing the current of the lamps and thus tends to reduce the direct current output to the measuring network. However, the increase of ambient temperature also increases the impedance of the shunt path afforded by condenser K and resistor R14 for the ripple current by increasing the resistance of resistor R14. As a result, the ripple current through the lamps increases and so compensates for the primary effect of ambient temperature upon the resistance of the lamps. This arrangement for temperature compensation is applicable to any of the systems herein disclosed in which the primary source of current supplies alternating or pulsating current.

In the system of Fig. 3, the rectifier bridge BR having a lamp bridge in its output as in the system of Fig. 1, is fed by a small alternator A which is driven by motor MI connected to the power line LL. If the power line is for supplying alternating current, motor M may be a synchronous motor in which case the output voltage of alternator A, notwithstanding changes of the line voltage, will be constant. However, the frequency of the line voltage is subject to variation, particularly to rather slow change, which affects the motor speed and therefore the output voltage of alternator A. As will be clear from the description of prior modifications, the lamp bridge LB compensates for the effect of such changes so that the potentiometer current remains constant.

As in the system of Fig. 6 the speed of motor MI may be controlled by a governor to maintain constancy regardless of usual variations of voltage and/or frequency; specifically, it may be a governor-controlled universal motor, suited for operation from either alternating or direct current supply lines.

Preferably, the alternator A is shunted by the series combination of condenser K3 and resistance R7 to provide a current path whose impedance varies inversely with frequency. When the speed of motor M increases, for example, the output voltage of alternator A tends to increase. However, the voltage rise is concurrent with a rise in frequency and the shunt path K3, R7 thereupon decreases in impedance drawing a heavier current, and a larger proportion of total current, with the result, the effective voltage of the alternator remains substantially constant despite variation in the speed of motor M.

To give a specific example, assuming the speed of motor MI to be about 1800 revolutions per minute; alternator A to be the inductor type and having an output winding of about 25 millihenries inductance and a resistance of 26 ohms, then using a condenser K3 of 10 microfarads capacity and a resistance R7 of about 136 ohms, a variation of ten per cent in the speed of motor MI will not change the input current of the lamp bridge more than about .05 per cent. The values of K3 and R7 given are not exact optimum but the values are not critical, for example, a one per cent variation in the value of R7 and a ten per cent variation in the value of K3 would have inappreciable effect on the constancy of the output current supplied to the rectifier network.

Except for gradual drift, the voltage impressed on the lamp bridge is therefore constant for different magnitudes and frequencies of the voltage of power line LL.

When the power line LL is for supplying direct current, the motor MI of Fig. 3 is of the constant speed type, as a shunt motor, or it may be a series motor provided with a governor to maintain substantially constant speed despite the inevitable changes in line voltage. The remainder of the system is the same as described. The motor generator MI, A needs only to supply a few watts of energy and can therefore be small and inexpensive.

In Fig. 3, the measuring system is shown as utilized for measuring the current through, or the voltage drop across resistance R8, serving as a device T responsive to changes in the load upon the power line L2. It is, of course, to be understood, that in all the systems described the responsive device T is suited to respond to the particular physical, electrical, chemical or other condition under measurement; for example, in Fig. 5, T is an ion-concentration cell for developing an electromotive force uniquely determined by the concentration of a selected ion in a solution.

The system shown in Fig. 4 is in some respects similar to the system of Fig. 2, the storage battery SB serving to smooth out changes of the rectifier output voltage due to changes of the line voltage. Further, the voltage drop in R4 increases upon increase of rectifier output voltage and vice versa so that voltage applied to the input terminals of the lamp bridge remains free of sudden variations. Resistance R4 may be ordinary resistance, or a metallic filament lamp; in the latter case the change in the voltage drop across R4 is greater for a given change in line, or rectifier output voltage. As in the other modifications, the lamp bridge compensates for the gradual changes of line voltage and for drift of the output voltage of the circuit devices preceding it.

This system has the advantage that even if there be a power line failure, or if, for any reason, current is not supplied to the rectifier network RA, the measuring network is, nevertheless, operative. For at least a substantial period of time, the battery SB, which may be of the primary or secondary type, preferably the latter, will continue to supply current to the lamp bridge which, in turn, will supply current of high degree of constancy to the measuring circuit. Because of the reversed poling of the rectifier V, there will be little or no discharge of current from the battery through resistance R4 and the secondary winding of the transfer IT.

In effect, under this circumstance, the system is substantially the same as that of Fig. 4a. Preferably, in the system of Fig. 4a, the battery B should be of the type whose voltage near the end of its life is but little less than is voltage when fresh, for example, the "Air-Cell" manufactured by the Everready Battery Company or the Le-Carbon battery. To compensate for the effect of ambient temperature upon the lamp bridge, the resistances R5 or R6 may be used as in Fig. 1, or preferably, and as shown, resistance R13 having suitable temperature coefficient may be included in the output conjugate arm of the bridge. When the lamps BR are of the tungsten or other metallic filament type, the conductor of resistance R13 should have a positive temperature coefficient. Thus, when the ambient temperature increases, tending to cause a decrease in the output current of the bridge, the resistance of R13 increases, causing a greater proportion of the total output current to flow through the slide wire S. Conversely if the lamps have a negative resistance-temperature coefficient for example if the filaments are of untreated carbon, the conductor of resistance R13 should have a negative resistance-temperature coefficient, for example, an electrolyte.

Alternatively, the compensating resistance may be in series with the slide-wire S in the output conjugate arm, or in series with the source of current, as B, in the input conjugate arm. In either case, the variation of the resistance with temperature should be opposite in sense or sign to the variation of the lamp resistance with temperature.

In the system of Fig. 5, the lamp bridge is supplied with current from the small direct-current generator AG which is driven by constant speed motor M1 which may be a synchronous motor when line LL is an alternating current supply line. As the speed of the generator AG stays constant though the line voltage may vary, the voltage impressed on the lamp bridge is free of rapid fluctuations.

In the system of Fig. 6, the speed of the motor M2 is controlled by a governor GM of any suitable type to maintain constant speed, and therefore substantially constant output voltage of the small generator AG. However, it is inevitable under actual conditions of operation that the governor characteristic is affected by conditions as temperature, friction, etc., so that although the speed is held constant, the speed at which it is held constant is somewhat different at different times. The lamp bridge compensates for the slow changes of the governor characteristic, the combination of governor-controlled motor and lamp bridge providing for supply of standard current through the potentiometer resistance from an ordinary power line, alternating current or direct current, as the primary source.

In the system of Fig. 7, the arrangement for compensating for sudden changes of line voltage is similar to that of Fig. 2, and includes a rectifier-filter network with a voltage regulator tube D. In Fig. 7, however, the output instead of being connected to a lamp bridge is connected to a network including a resistance device R8 having a characteristic generally as shown in Fig. 7a which for a substantial range of voltage, as from $v1$ to $v2$, passes a fixed current. For example, it may be an iron wire in an atmosphere of hydrogen. To obtain the desired amount of current through the potentiometer resistance S and further to reduce the effect of voltage variations, the resistance R9 is connected in shunt to the slide wire S and resistance R10 in series.

The device 8 has a time lag so that of itself it would be unsuited to ensure constancy of the potentiometer current. The filter-rectifier network, or equivalent, compensates for the sudden changes of line voltage but supplies a voltage which from time to time may vary within the range $v1$ to $v2$ of Fig. 7a for which the device R8 is capable of passing constant current. Instead of the filter system, any of the other described arrangements may be used to supply current free of rapid variation to the network R8, R9, R10, etc.

It is characteristic of the systems illustrated and described for obtaining current of highly constant magnitude from power line that the power line feeds or operates a device or arrangement which eliminates or compensates for changes of line voltage and/or frequency, and which in turn supplies voltage or current subject to slow variations to a second device or arrangement incapable of compensating for rapid changes of input voltage or current but having the ability to provide highly constant output for slow changes of input; the second device or arrangement supplying constant current to a measuring network for precision measurements or control of a condition.

For measurement of the magnitude of the condition under measurement with any of the systems specifically disclosed, the contact C is moved relative to the slide wire S until there is no deflection of the galvanometer. The calibrated scale SS then indicates the measured magnitude and since the slide wire current is held constant, the readings are highly accurate despite the nature of the primary source of the slide wire current, changes of temperature, etc. This balancing of the measuring network can be effected manually or by automatic recorder mechanism, for example, of the type shown in the aforesaid Squibb Patent No. 1,937,732. My invention makes it unnecessary to check the slide wire current, from time to time, against a standard cell and to restandardize it; specifically, for automatic recorder mechanisms as of the Squibb or similar type, it obviates need for switch structure and operating mechanism therefor suitably to change the circuit connections to include the standard cell, and for clutch mechanism to couple the operating member of a standardizing resistance to the recorder mechanism.

What I claim is:

1. A system comprising a measuring network, and means for supplying current of high constancy to said network from a power line comprising means energized from said line having the characteristic of providing a substantially constant output voltage despite rapid changes of input from said line, means energized by the output voltage of said first means having the characteristic of providing a highly constant output voltage despite slow changes of input voltage applied thereto, and means for connecting said second means to supply current to said measuring network.

2. A system comprising a measuring network, and means for supplying current of high constancy to said network from a power line comprising means energized from said line having the characteristic of providing a substantially constant output voltage despite rapid changes of input from said line, and a lamp bridge having its input terminals connected to the output terminals of said means and having its output terminals connected to said measuring network to supply a highly constant voltage thereto, said lamp bridge having the characteristic that its output voltage remains constant despite large slow changes of the voltage impressed on its input terminals by said supply means.

3. A system comprising a measuring network, and means for supplying current of high constancy to said network from an alternating current power line, comprising a transformer supplied from said line having its windings and core structure so constructed and arranged that its output voltage remains substantially constant despite sudden changes of input from the line, means energized by the output voltage of said transformer having the characteristic of providing a highly constant output voltage despite slow changes of input voltage applied thereto, and means for connecting said second means to supply current to said measuring network.

4. A system comprising a measuring network, and means for supplying current of high constancy to said network from a power line comprising a motor-generator including a constant-speed motor energized from said line to provide a substantially constant generated voltage despite variations of line voltage, means energized from the generated voltage having the characteristic of providing a highly constant output voltage despite slow variations of the generated voltage, and means for connecting said second means to supply current to said measuring network.

5. A system comprising a measuring network, and means for supplying current of high constancy to said network from an alternating current power line comprising a system energized from said line and including a rectifier and a voltage regulating device for providing a substantially constant output voltage despite sudden changes of line voltage, and means energized by the output voltage of said system having the characteristic of providing a highly constant output voltage despite slow variations of the output voltage of said rectifier system, and means for connecting said second means to supply current to said measuring network.

6. A system comprising a measuring network, and means for supplying current of high constancy to said network from an alternating current power line comprising a transformer supplied from said line having its windings and core structure so constructed and arranged that its output voltage remains substantially constant despite sudden changes of input from the line, and a lamp bridge energized by the output voltage of said transformer and having its output terminal connected to said measuring network.

7. A system comprising a measuring network, and means for supplying current of high constancy to said network from a power line comprising a motor-generator including a constant-speed motor energized from said line to provide a substantially constant generated voltage despite variations of line voltage, and a lamp bridge energized by the generated voltage and having said measuring network in its output circuit.

8. A system comprising a measuring network, and means for supplying current of high constancy to said network from an alternating current power line comprising a system energized from said line and including a rectifier and a voltage regulating device for providing a substantially constant output voltage despite sudden changes of line voltage, and a lamp bridge energized by the output voltage of said system and having said measuring network in its output circuit.

9. A system comprising a measuring network, and means for supplying current of high constancy to said network from an alternating current power line, comprising a transformer supplied from said line having its windings and core structure so constructed and arranged that its output voltage remains substantially constant despite sudden changes of input from the line, means energized by the output voltage of said transformer having the characteristic of providing a highly constant output voltage despite slow changes of input voltage applied thereto, means for connecting said second means to supply current to said measuring network, and load-stabilizing means in the output circuit of said transformer for drawing current therefrom which is large compared to any variations of current from the transformer incident to operation of said second means.

10. A system comprising a measuring network, and means for supplying current of high constancy to said network from a power line comprising means energized from said line having the characteristic of providing a substantially constant output voltage despite rapid changes of input from said line, means energized by the output voltage of said first means having the characteristic of providing a highly constant output voltage despite slow changes of input voltage applied thereto, means for connecting said second means to supply current to said measuring network, and load-stabilizing means energized by the output voltage of said first means.

11. A system comprising a measuring network, and means for supplying current of high constancy to said network from a power line comprising a motor-alternator including a constant-speed motor energized from said line to provide a substantially constant generated voltage despite variations of line voltage, means energized from the generated voltage having the characteristic of providing a highly constant output voltage despite slow variations of the generated voltage, means for connecting said second means to supply current to said measuring network, and a combination of reactance and resistance having impedance varying inversely with frequency supplied by the alternator for keeping the output voltage substantially constant despite variations of frequency.

12. A system comprising a measuring network, and means for supplying current of high constancy to said network from an alternating current power line comprising a rectifier-filter system energized from said line, a resistance and a gaseous discharge tube connected in series between the output conductors of said rectifier-filter system, a lamp bridge having its input connected across said tube, and means for connecting said measuring network in the output circuit of said lamp bridge.

13. A system comprising a measuring network, and means for supplying current of high constancy to said network from a power line comprising a filter system energized from said line, a resistance and a gaseous discharge tube connected in series between the output conductors of said filter system, a lamp bridge having its input connected across said tube, and means for connecting said measuring network in the output circuit of said lamp bridge.

14. A system comprising a direct-current potentiometer measuring network, and means for supplying direct current of high constancy to said network from an alternating current power line comprising a transformer supplied from said line having its windings and core structure so constructed and arranged that its output voltage remains substantially constant despite sudden variations of input from the line, a rectifier system in the secondary circuit of said transformer, a lamp bridge in the output circuit of said rectifier system, and means for connecting said potentiometer network in the output circuit of said lamp bridge.

15. A system comprising a measuring network, a lamp bridge system for supplying current to said network, means for supplying current substantially free of rapid change to said lamp bridge, and means for compensating for the effect of ambient temperature upon the lamp bridge to prevent change of the current supplied thereby to said measuring network with change of ambient temperature.

16. A system comprising a measuring network, a lamp bridge system for supplying current to said network, means for supplying current substantially free of rapid change to said lamp bridge, and temperature-responsive means for controlling the operating temperature of the lamp conductor.

17. A system comprising a measuring network, a lamp bridge system for supplying current to said network, means for supplying current substantially free of rapid change to said lamp bridge, and a conductor included in said lamp bridge system having a substantial coefficient of resistance to compensate for the effect of change in ambient temperature upon the operating characteristic of the lamp structure of the bridge system.

18. A system comprising a measuring network, a lamp bridge system for supplying current to said network, means for supplying current substantially free of rapid change to said lamp bridge, and a conductor included in an arm of said bridge and whose resistance changes with change of temperature in proper sense to compensate for the effect of the change in temperature upon the lamp resistance.

19. A system comprising a measuring network, a lamp bridge system for supplying current to said network, means for supplying current substantially free of rapid change to said lamp bridge, and a conductor included in an arm of the bridge other than an arm including a lamp whose resistance varies with change of temperature in the same sense that the resistance of the lamp varies with temperature.

20. A system comprising a lamp bridge, a measuring network included in one conjugate arm of the lamp bridge, means for supplying current substantially free of rapid change included in another conjugate arm of the lamp bridge, and a conductor included in one of said conjugate arms whose variation of resistance with temperature compensates for the effect upon the current supplied to the measuring network of the change of temperature upon the lamp resistance.

21. A system comprising a lamp bridge, a measuring network included in one conjugate arm of the lamp bridge, means for supplying current substantially free of rapid change included in another conjugate arm of the lamp bridge, and a conductor included in said first conjugate arm in parallel with said network and whose resistance varies with temperature in the same sense that the lamp resistance varies with temperature.

22. A system comprising a measuring network, a lamp bridge system for supplying current to said network, means for supplying current substantially free of rapid change to said bridge, and means effecting in response to change of temperature the resistance of at least one arm of the bridge to compensate for the effect of the change of temperature upon the lamp resistance.

ALBERT J. WILLIAMS, Jr.

CERTIFICATE OF CORRECTION.

Patent No. 2,032,455. March 3, 1936.

ALBERT J. WILLIAMS, JR.

It is hereby certified that error appears in the printed specification of the above numbered patent requiring correction as follows: Page 1, first column, line 53, for "coils" read coil; page 2, first column, line 5, for "arms, the" read arms. The; and second column, line 10, after "i. e.", line 12, after "etc." and line 33, after "mfd." strike out the comma; same page and column, line 22, for "in" read is; line 32, for "singe" read single; line 55, for "change" read changes; page 3, first column, line 24, after "bridge" insert a comma; and second column, line 25, for "of" read to; line 68, before "ordinary" insert an; page 4, first column, line 37, after "coefficient" insert a comma; and that the said Letters Patent should be read with these corrections therein that the same may conform to the record of the case in the Patent Office.

Signed and sealed this 12th day of May, A. D. 1936.

(Seal)

Leslie Frazer
Acting Commissioner of Patents.